(12) United States Patent
Liu et al.

(10) Patent No.: US 11,501,002 B2
(45) Date of Patent: Nov. 15, 2022

(54) PROTOCOL SECURITY SYSTEM

(71) Applicant: Dell Products L.P., Round Rock, TX (US)

(72) Inventors: Wei Liu, Austin, TX (US); Po-Yu Cheng, Taipei (TW); Yu-Hsuan Yang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 16/946,912

(22) Filed: Jul. 10, 2020

(65) Prior Publication Data

US 2022/0012342 A1    Jan. 13, 2022

(51) Int. Cl.
*G06F 21/57*  (2013.01)
*G06F 21/79*  (2013.01)
*G06F 21/54*  (2013.01)

(52) U.S. Cl.
CPC .......... *G06F 21/577* (2013.01); *G06F 21/54* (2013.01); *G06F 21/572* (2013.01); *G06F 21/79* (2013.01)

(58) Field of Classification Search
CPC ...... G06F 21/577; G06F 21/54; G06F 21/572; G06F 21/79
USPC ........................................................ 726/25
See application file for complete search history.

(56) References Cited

U.S. PATENT DOCUMENTS

| | | | | |
|---|---|---|---|---|
| 7,607,173 | B1* | 10/2009 | Szor | G06F 12/1483 |
| | | | | 713/188 |
| 2004/0003271 | A1* | 1/2004 | Bourne | G06F 21/10 |
| | | | | 713/193 |
| 2013/0263262 | A1* | 10/2013 | Forristal | G06F 21/577 |
| | | | | 726/22 |
| 2017/0262387 | A1* | 9/2017 | Sell | G06F 12/1441 |
| 2020/0218597 | A1* | 7/2020 | Itkin | G06F 12/10 |
| 2020/0364341 | A1* | 11/2020 | Ochiai | G06F 8/65 |

OTHER PUBLICATIONS

Driver Writer's Guide for UEFI 2.3.1 by Intel (Year: 2012).*

* cited by examiner

*Primary Examiner* — Michael S McNally
(74) *Attorney, Agent, or Firm* — Joseph Mencher

(57) ABSTRACT

A protocol security system includes a protocol producer driver stored in a first memory range on a primary memory system, a protocol consumer driver stored on the primary memory system, and a firmware interface engine provided via the primary memory system. The firmware interface engine receives a protocol pointer from the protocol consumer driver, and identifies that the protocol pointer was provided by the protocol producer driver. If the firmware interface engine determines that the protocol pointer is not stored in the first memory range on the primary memory system, it generates a protocol security violation. If the firmware interface engine determines that the protocol pointer is stored in the first memory range on the primary memory system and points to an architectural protocol, it determines whether the protocol producer driver originated from a secondary memory system and, if not, generates a protocol security violation.

20 Claims, 6 Drawing Sheets

PROTOCOL SECURITY SYSTEM

BACKGROUND

The present disclosure relates generally to information handling systems, and more particularly to securely performing protocols in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example server computing devices, desktop computing devices, laptop/notebook computing devices, tablet computing devices, mobile phones, and/or other computing devices known in the art, may utilize Unified Extensible Firmware Interface (UEFI) firmware that provides an interface between an operating system in the computing device and firmware in the computing device, and that one of skill in the art in possession of the present disclosure will recognize replaces the legacy Basic Input/Output System (BIOS) firmware interface. UEFI firmware may be utilized to provide various services in the computing device via, for example, UEFI protocols that provide UEFI protocol services such as file authentication services for UEFI secure boot, password services for user credentials, SetVariable services, SetAttribute services, and/or other services known in the art, with many of the services provided by the UEFI firmware being essential to the operation of the computing device operation, and some being used to protect the UEFI firmware.

However, conventional computing devices and UEFI firmware do not provide the ability to identify a driver that originated or installed a UEFI protocol, which allows any driver provided on the computing device to install a UEFI protocol that provides a UEFI protocol service. As such, malicious drivers provided on the computing device may impersonate an authorized driver and provide a UEFI protocol that bypasses security checks (e.g., subsequent to secure boot operations) in order to, for example, eavesdrop on credentials and/or other secure information, maliciously configure the computing device, etc. For example, UEFI protocol services may be provided via pointers that point to functions that are executed to perform the UEFI protocol that is stored in a memory system in the computing device, and thus malicious UEFI protocols providing malicious UEFI protocol services may be provided in a computing device by a malicious driver via the replacement or modification of an authentic pointer with a malicious pointer that points to the malicious UEFI protocol that provides the malicious UEFI protocol service.

Accordingly, it would be desirable to provide a protocol security system that addresses the issues discussed above.

SUMMARY

According to one embodiment, an Information Handling System (IHS) includes a processing system; and a primary memory system that is coupled to the processing system and that includes instructions that, when executed by the processing system, cause the processing system to provide a firmware interface engine that is configured to: receive, from at least one protocol consumer driver that is stored on the primary memory system, a first protocol pointer; identify that the first protocol pointer was provided by the first protocol producer driver; determine, in response to identifying that the first protocol pointer was provided by the first protocol producer driver, that the first protocol pointer is not stored in a first memory range on the primary memory system that is associated with the first protocol producer driver; and generate, in response to determining that the first protocol pointer is not stored in the first memory range on the primary memory system that is associated with the first protocol producer driver, a protocol security violation.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
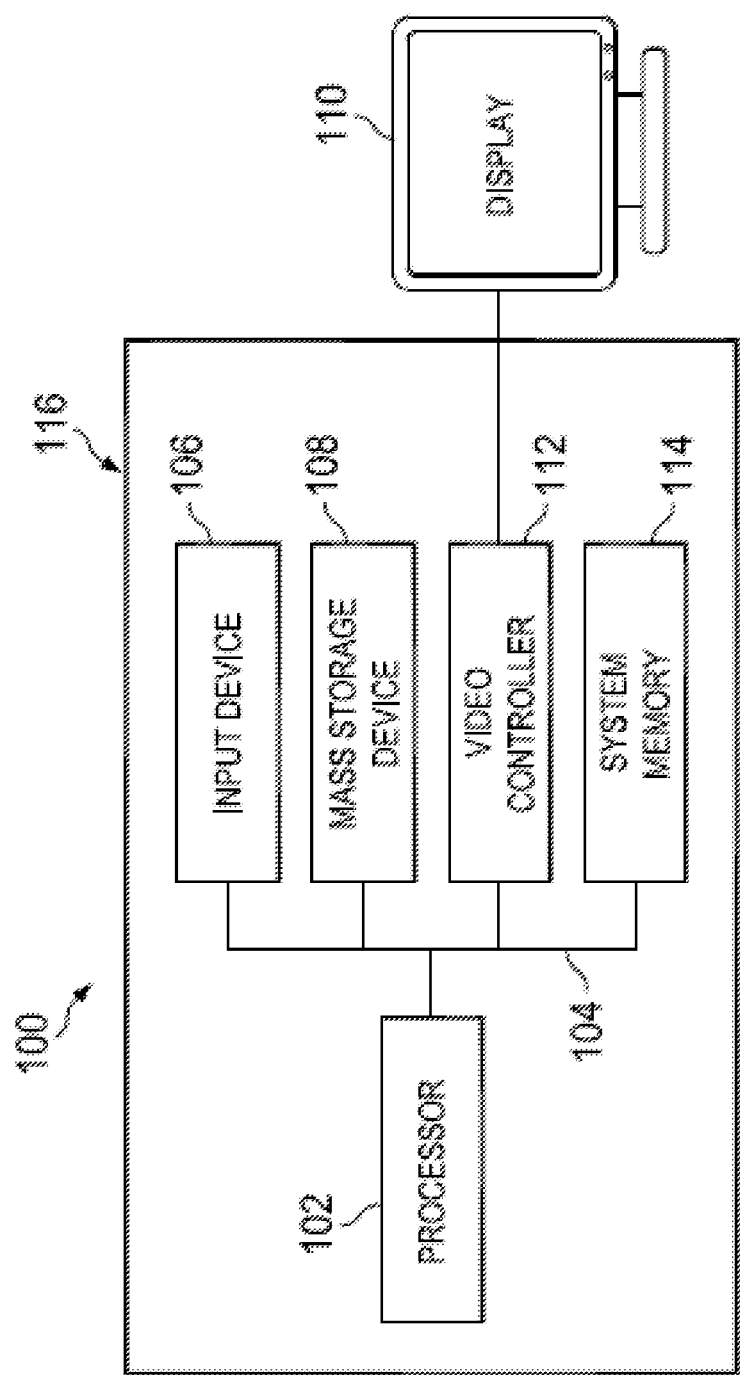
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
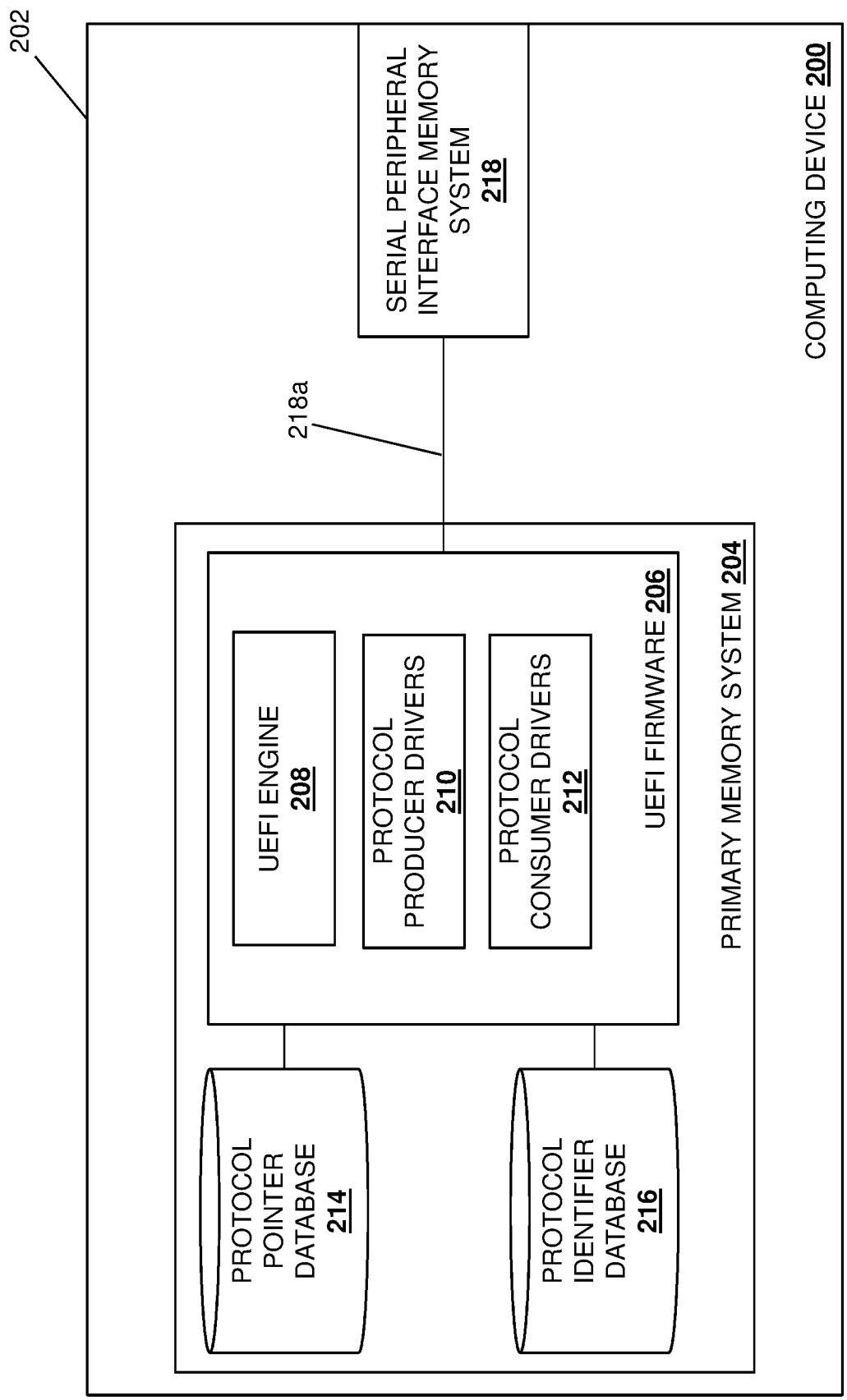
FIG. 2 is a schematic view illustrating an embodiment of a computing device that may implement the protocol security system of the present disclosure.

Referring now to FIG. 2, an embodiment of a computing device 200 is illustrated that may utilize the protocol security system of the present disclosure. In an embodiment, the computing device 200 may be provided by the IHS 100 discussed above with reference to FIG. 1, and/or may include some or all of the components of the IHS 100. One of skill in the art in possession of the present disclosure will recognize that, in the embodiments illustrated and discussed below, the computing device 200 may be provided by a server computing device, although desktop computing devices, laptop/notebook computing devices, tablet computing devices, module phones, and/or other computing devices known in the art will fall within the scope of the present disclosure as well. As such, while illustrated and discussed as being provided by a server computing device including a particular secondary memory system that is provided by a Basic Input/Output System (BIOS) Serial Peripheral Interface (SPI) Read-Only Memory (ROM)/flash memory, one of skill in the art in possession of the present disclosure will recognize that computing devices provided in the protocol security system of the present disclosure may include any devices that may be configured to operate similarly as the computing device 200 discussed below.

In the illustrated embodiment, the computing device 200 includes a chassis 202 that houses the components of the computing device 200, only some of which are illustrated and discussed below. For example, the chassis 202 may house a processing system (not illustrated, but which may include the processor 102 discussed above with reference to FIG. 1) and a primary memory system 204 (e.g., which may include the memory 114 discussed above with reference to FIG. 1) that is coupled to the processing system and that includes instructions that, when executed by the processing system, cause the processing system to provide the engines, drivers, and/or other processor/memory subsystems that are configured to perform the functionality of the engines, drivers, and/or computing devices discussed below.

In the illustrated embodiment, the processing system and primary memory system 204 discussed above provide UEFI firmware 206 that one of skill in the art in possession of the present disclosure will recognize is configured to provide an interface between an operating system in the computing device 200 and firmware in the computing device 200, and that was provided to replace the legacy Basic Input/Output System (BIOS) firmware interface. In the illustrated embodiment, the UEFI firmware 206 includes a UEFI engine 208, protocol producer drivers 210, and protocol consumer drivers 212, although one of skill in the art in possession of the present disclosure will recognize that UEFI firmware may be include and/or be provided by other UEFI components while remaining within the scope of the present disclosure as well. As such, the primary memory system 204 may include instructions that, when executed by the processing system in the computing device 200, cause the processing system to provide the UEFI engine 208, the protocol producer drivers 210, and the protocol consumer drivers 212. In a specific example, the processing device in the processing system that provides the UEFI engine 208 may include a Driver eXecution Environment (DXE) core in the processing system, although other processing system components may provide the firmware interface engine of the present disclosure while remaining within it scope as well. Furthermore, as discussed below, the code utilized to provide the protocol producer drivers 210 and the protocol consumer drivers 212 may be copied from other memory systems and/or computing device subsystems and provided on the primary memory system 204 during or subsequent to computing device initialization operations.

In the illustrated embodiment, the primary memory system 204 also include a protocol pointer database 214 and a protocol identifier database 216 that are each coupled to the UEFI firmware 206 and that, as discussed below, includes protocol pointers and protocol identifiers, respectively, that may be utilized by the UEFI firmware 206 to execute UEFI protocols that are provided by and included in the protocol producer drivers 210 (i.e., stored in the primary memory system 204 with the protocol producer driver that provides them.) In the examples below, the chassis 202 also houses a Serial Peripheral Interface (SPI) memory system 218 (e.g., a BIOS SPI ROM/flash memory) that is coupled to the UEFI firmware 206 via an SPI interface 218a, although one of skill in the art in possession of the present disclosure will recognize that the SPI memory system 218 may be replaced by a variety of secondary memory systems that may be coupled to the primary memory system by a secondary memory system interface while remaining within the scope of the present disclosure as well. However, while a specific computing device 200 with specific protocol security system components has been illustrated, one of skill in the art in possession of the present disclosure will recognize that computing devices and/or protocol security systems (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
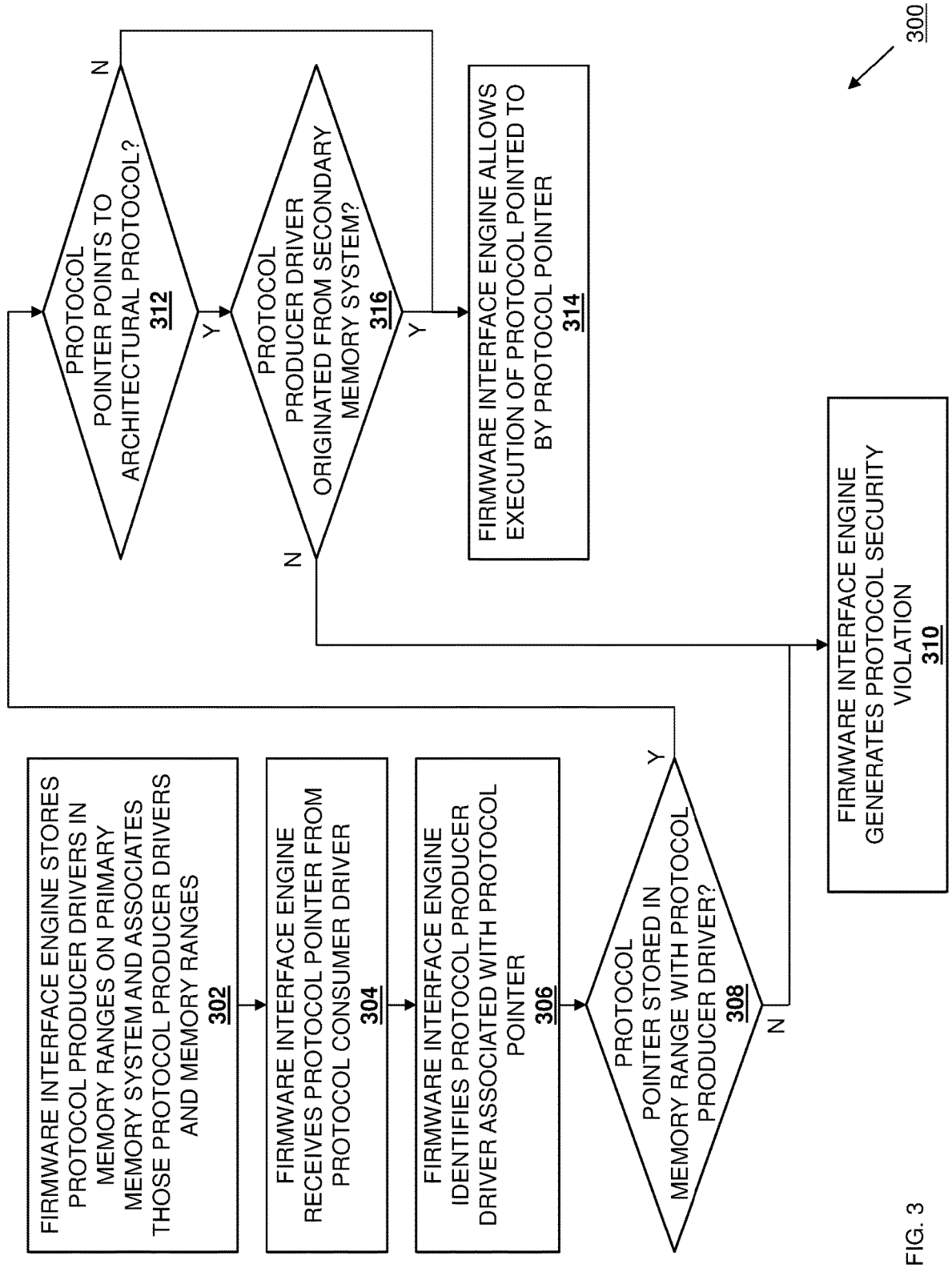
FIG. 3 is a flow chart illustrating an embodiment of a method for securely performing protocols.

Referring now to FIG. 3, an embodiment of a method 300 for securely performing protocols is illustrated. As discussed below, the systems and methods of the present disclosure provide for the tracking of protocols provided for use in a computing device in order to allow the verification of a protocol producer driver that provided a protocol that is to-be performed, ensure that protocol is located with that protocol producer driver and, if that protocol is an architectural protocol, verify that protocol producer driver originated from a memory system that is authorized to provide protocol producer drivers that provide architectural protocols. For example, a protocol security system includes a protocol producer driver that is stored in a first memory range on a primary memory system, a protocol consumer driver that is stored on the primary memory system, and a firmware interface engine that is provided via the primary memory system. The firmware interface engine receives a protocol pointer from the protocol consumer driver, and identifies that the protocol pointer was provided by the protocol producer driver. In response to determining that the protocol pointer is not stored in the first memory range on the primary memory system, the firmware interface engine will generate a protocol security violation. If the protocol pointer is stored in the first memory range on the primary memory system and the firmware interface engine determines that the protocol pointer points to an architectural protocol, the firmware interface engine determines whether the protocol producer driver originated from a secondary memory system that is authorized to provide protocol producer drivers that provide architectural protocols and, if not, the firmware interface engine generates a protocol security violation. As such, the use of protocols in a computing device may be secured to ensure that any protocols that are performed are stored with the protocol producer driver that provided them, and that any architectural protocols that are performed come from protocol producer drivers that originated from an authorized memory system, thus preventing malicious drivers from enabling the performance of malicious protocols on the computing device.

The method 300 begins at block 302 where a firmware interface engine stores protocol producer drivers in memory ranges on a primary memory system, and associates those protocol producer drivers with those memory ranges. In an embodiment, at block 302, protocol producer drivers may be stored on a primary memory system in the computing device 200 following, for example, power-on, reset, and/or other initialization/boot operations performed by the computing device 200, as well as during runtime operations for the computing device 200. With reference to FIG. 2, one of skill in the art in possession of the present disclosure will recognize that at least some of the protocol producer drivers 210 (e.g., "platform" drivers) may be loaded, stored, and/or otherwise provided by the UEFI engine 208 on the primary memory system 204 from the serial peripheral interface memory system 218. For example, at least some of the protocol producer drivers 210 may be published by Basic Input/Output System (BIOS) intrinsic drivers and/or other code that originates from the BIOS SPI ROM/flash memory. However, one of skill in the art in possession of the present disclosure will recognize that at least some of the protocol producer drivers 210 (e.g., "third-party" drivers) may be published via on other subsystems (e.g., Peripheral Component Interconnect express (PCIe) option ROMs, external storage drives, etc.) and, at block 302, may be loaded, stored, and/or otherwise provided on the primary memory system 204 by the UEFI engine 208 as well. As will be appreciated by one of skill in the art in possession of the present disclosure, the protocol consumer drivers 212 may be provided on the primary memory system 204 in a similar manner as well.

Figure 4:
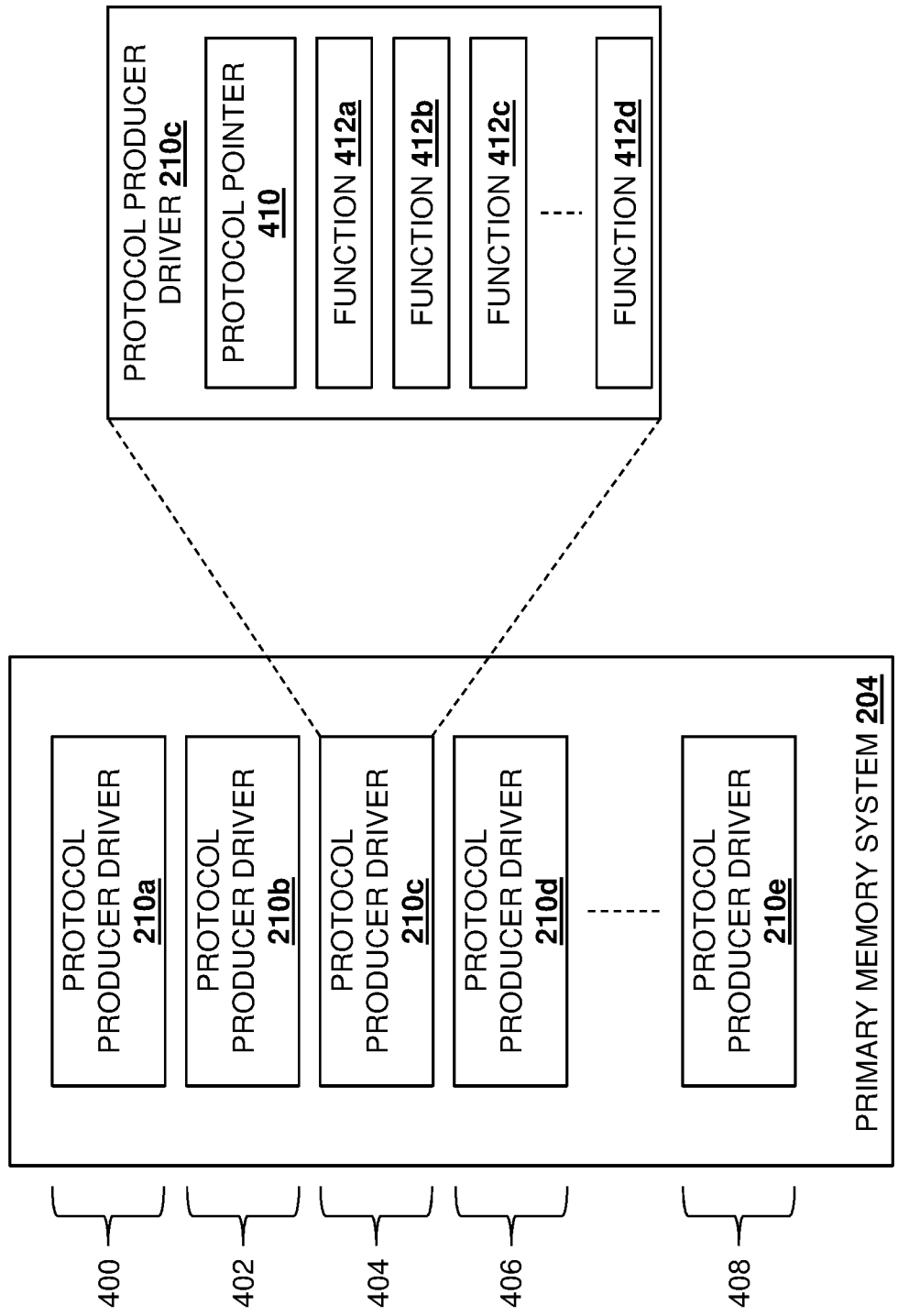
FIG. 4 is a schematic view illustrating an embodiment of protocol producer drivers stored on the computing device of FIG. 2 during the method of FIG. 3.

With reference to FIG. 4, an embodiment of the storage of the protocol producer drivers 210 in the primary memory system 204 is illustrated. As can be seen in FIG. 4, at block 302, the UEFI engine 208 may operate to store a protocol producer driver 210a in a memory range 400 in the primary memory system 204, a protocol producer driver 210b in a memory range 402 in the primary memory system 204, a protocol producer driver 210c in a memory range 404 in the primary memory system 204, a protocol producer driver 210d in a memory range 406 in the primary memory system 204, and up to a protocol producer driver 210e in a memory range 408 in the primary memory system 204. For example, a DXE core in the processing system that provides the UEFI engine 208 may load EFI protocol producer drivers into the primary memory system 204, with the primary memory system 204 operating to protect those EFI protocol producer drivers by making them "read-only". As will be appreciated by one of skill in the art in possession of the present disclosure, the storage of the protocol producer drivers 210 on the primary memory system 204 will associate a respective "device path" with each of those protocol producer drivers 210 that, as discussed below, allows the origin of that protocol producer driver (e.g., the secondary memory system 218/BIOS SPI ROM/flash memory, a PCIe option ROM, an external storage device, etc.) to be identified by the UEFI engine 208.

One of skill in the art in possession of the present disclosure will recognize that each protocol producer driver 210 may include a protocol pointer and a plurality of functions that may be executed to perform a protocol provided by that protocol producer driver. For example, FIG. 4 illustrates how the protocol producer driver 210c stored in the memory range 404 on the primary memory system 204 includes a protocol pointer 410 that is stored in the memory range 404 on the primary memory system 204, as well as a plurality of functions 412a, 412b, 412c, and up to 412d that are stored in the memory range 404 on the primary memory system 204 and that may be executed to perform a UEFI protocol provided by the protocol producer driver 210c, and one of skill in the art in possession of the present disclosure will recognize that the protocol producer drivers 210a, 210b, 210d, and up to 210e may include their own protocol pointers and functions stored in their corresponding memory ranges as well. Furthermore, while the protocol producer driver 210c is illustrated and described below as including a single protocol pointer 410 and functions 412a-412d for a single UEFI protocol, one of skill in the art in possession of the present disclosure will appreciate that protocol producer drivers may provide multiple protocols (e.g., multiple protocol pointers and corresponding functions) while remaining within the scope of the present disclosure as well.

In response to storing the protocol producer drivers 210 in the primary memory system 204, the UEFI engine 208 may associate the corresponding memory range on the primary memory system 204 in which a protocol producer driver was stored with that protocol producer driver. As such, with reference to FIG. 4, the UEFI engine 208 may associate (in a database) the protocol producer driver 410 with the memory range 404 in the primary memory system 204 in which that protocol producer driver 210c is stored, and one of skill in the art in possession of the present disclosure will recognize that the protocol producer drivers 210a, 210b, 210d, and up to 210e may be associated with the corresponding memory ranges 400, 402, 406 and up to 408 in the primary memory system 204 in which they are stored as well. In a specific example, the association of a memory range in the primary memory system 204 with the protocol producer driver that is stored in that memory range may include the recording of the base address in the primary memory system 204 at which that protocol producer driver "begins", and the length of that protocol producer driver. As will be appreciated by one of skill in the art in possession of the present disclosure, the identification of the base address and length of a protocol producer driver provides an association of that protocol producer driver with the memory range in which it is stored (e.g., with the base address providing the beginning of the memory range in which that protocol producer driver is stored, and the length providing for a determination of the ending of that memory range in which that protocol producer driver is stored.) However, while a specific technique is described, one of skill in the art in possession of the present disclosure will recognize that associations of protocol producer drivers and their storage locations may be performed in a variety of manners that will fall within the scope of the present disclosure as well.

One of skill in the art in possession of the present disclosure will recognize that each of the protocol producer drivers 210 may install its corresponding protocol(s) for use in the computing device 200. For example, each protocol producer driver 210 may use an EFI boot service such as a UEFI Application Programming Interface (API) "InstallProtocolInterface( )" boot service or "InstallMultipleProtocolInterfaces( )" boot service to "pass" or otherwise provide the protocol pointer(s) that operate to provide their UEFI protocols in the protocol pointer database 214, as well as the protocol identifier(s) and protocol interface(s) that operate to provide their UEFI protocols in the protocol identifier database 216. In a specific example, each protocol pointer stored in a protocol producer driver 210 and provided in the protocol pointer database 214 may be provided by a handle (e.g. an "EFI_HANDLE") that one of skill in the art in possession of the present disclosure will recognize is a global variable that is stored with the protocol producer driver that provided it in the examples below, but that also may be provided by an image handle from the protocol producer driver entry point (which is also a part of the image module for the protocol producer driver that provided it) while remaining within the scope of the present disclosure as well.

Figure 5:
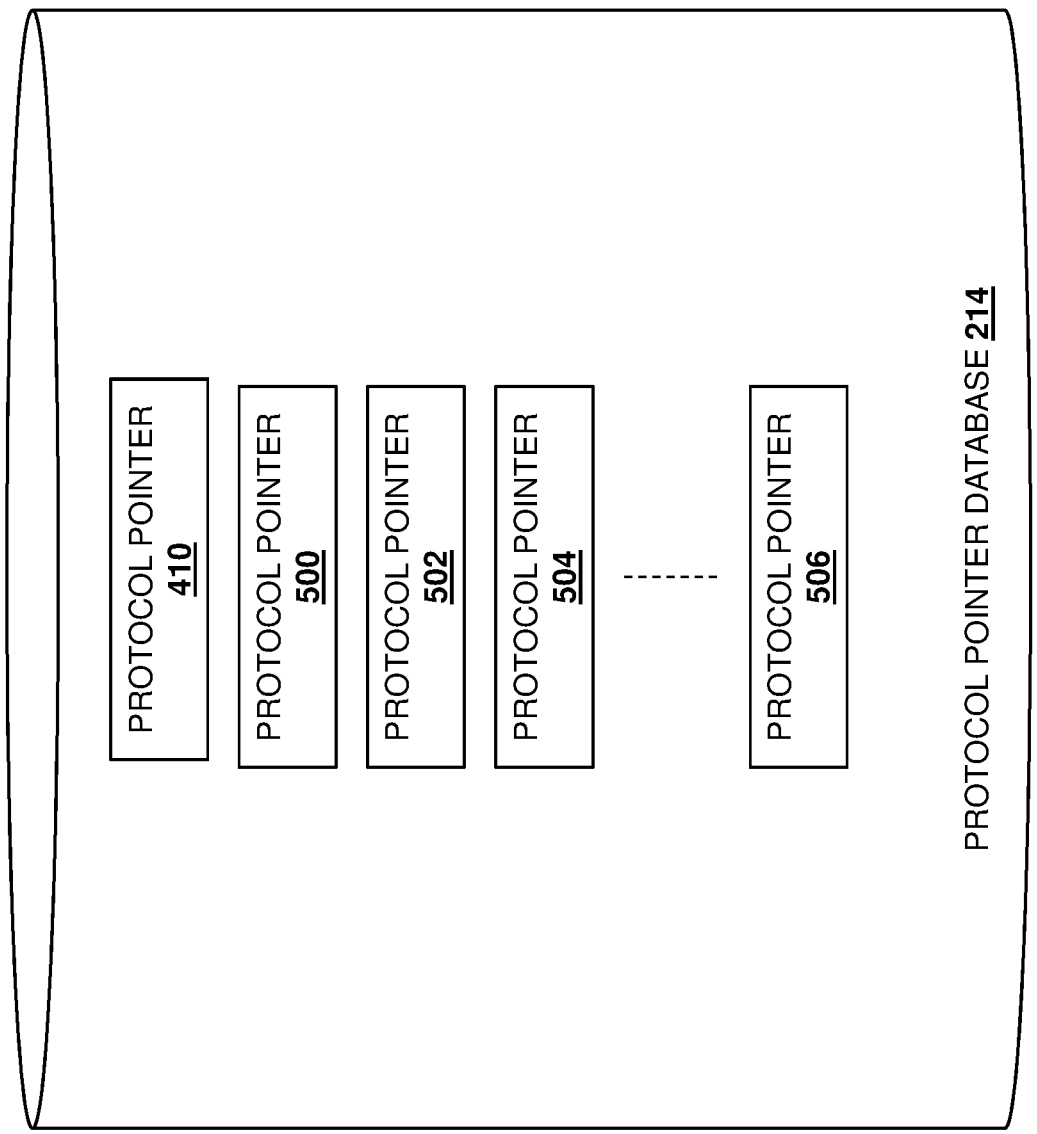
FIG. 5 is a schematic view illustrating an embodiment of a protocol handle database in the computing device of FIG. 2 that may be populated during the method of FIG. 3.
Figure 6:
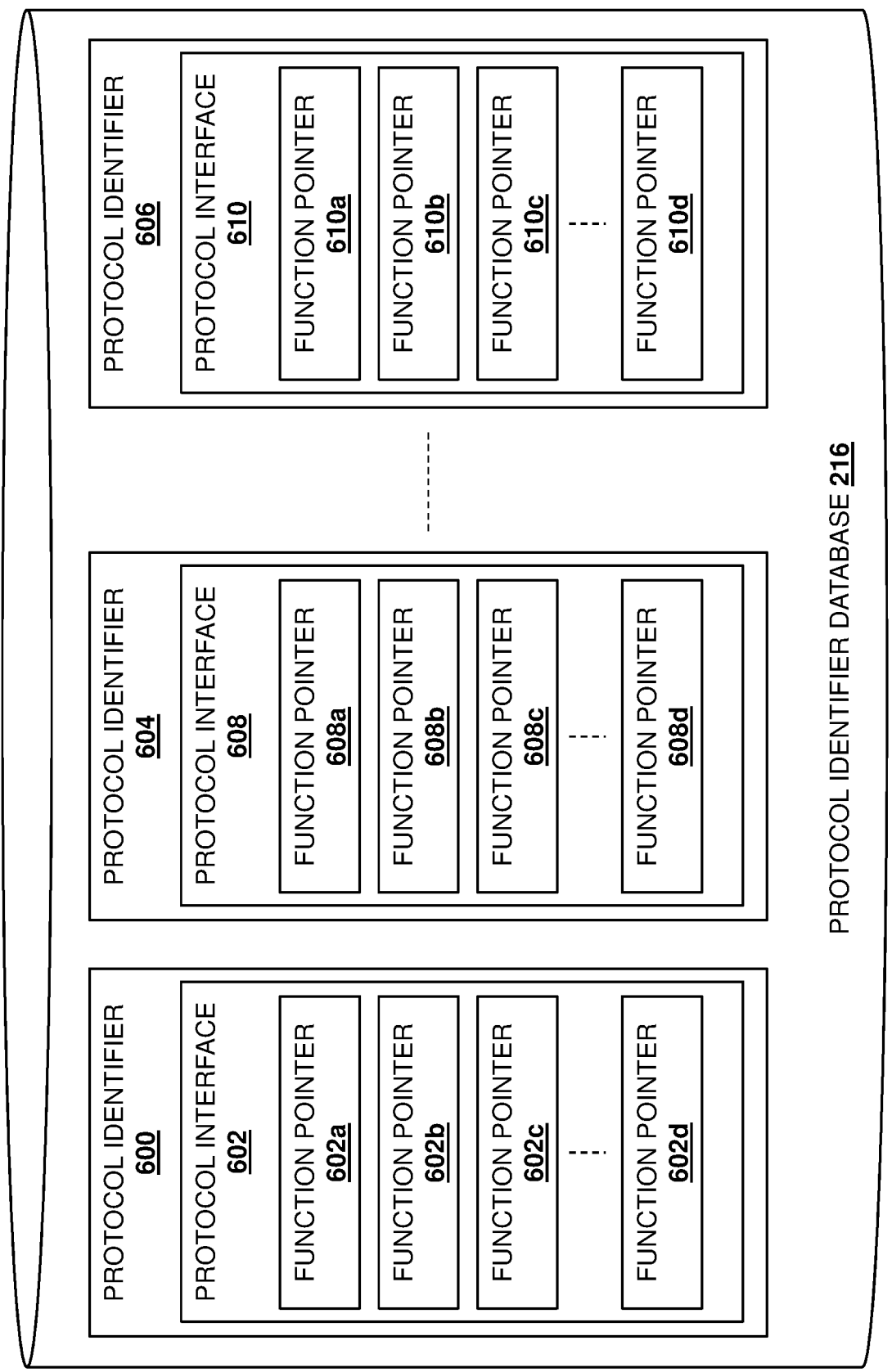
FIG. 6 is a schematic view illustrating an embodiment of a protocol identifier database in the computing device of FIG. 2 that may be populated during the method of FIG. 3.

As illustrated in FIG. 5, following the installation of UEFI protocols by the protocol producer drivers 210, the protocol pointer database 214 may include a plurality of protocol pointers such as the protocol pointer 410 provided by the protocol producer driver 210c, as well as protocol pointers 500, 502, 504, and up to 506 that may be provided by any of the protocol producer drivers 210a, 210b, 210c, and/or up to 210e. Furthermore, the installation of a UEFI protocol may also include the storage of function pointers in the protocol identifier database 216 for each function that provides that UEFI protocol. For example, as illustrated in FIG. 6, the protocol identifier database 216 may include a protocol identifier 600 (e.g., a Globally Unique Identifier (GUID)) that is associated with the protocol pointer 410 that is stored in both the protocol producer driver 210c and the protocol pointer database 214, and a protocol interface 602 may be provided with that protocol identifier 600 and may include a plurality of function pointers 602a, 602b, 602c, and up to 602d that one of skill in the art in possession of the present disclosure will recognize may point to the respective functions 412a, 412b, 412c, and up to 412d that are stored with the protocol producer driver 210c, as discussed above with regard to FIG. 4. FIG. 6 also illustrates how the protocol identifier database 216 may store protocol identifiers 604 and up to 606 that are associated with respective protocol pointers stored in one or more of the protocol producer drivers 210 as well as the protocol producer database 214, with a protocol interface 608 provided with the protocol identifier 604 and including function pointers 608a, 608b, 608c, and up to 608d that point to functions stored with a corresponding protocol producer device, and a protocol interface 610 provided with the protocol identifier 606 and including function pointers 610a, 610b, 610c, and up to 610d that point to functions stored with a corresponding protocol producer device.

The method 300 then proceeds to block 304 where the firmware interface engine receives a protocol pointer from a protocol consumer driver. In an embodiment, at block 304, any of the protocol consumer drivers 212 may provide instruction(s) to the UEFI engine 208 to perform a UEFI protocol provided by one of the protocol producer drivers 210 by identifying a protocol pointer that is stored in the protocol pointer database 214 and that is associated with that UEFI protocol. As will be appreciated by one of skill in the art in possession of the present disclosure, in a conventional computing device, a UEFI protocol may be performed by identifying the protocol pointer for that UEFI protocol in the protocol pointer database 214, identifying the protocol identifier in the protocol identifier database 216 that is associated with that protocol pointer, and then using the function pointers in the protocol interface provided with that protocol identifier in the protocol identifier database 216 to execute the functions that are stored with the protocol producer driver that provided that UEFI protocol in order to perform that UEFI protocol. As such, with reference to the UEFI protocol provided by the protocol producer driver 210c, a protocol consumer driver 212 in a conventional computing device would identify to the UEFI engine 208 the protocol pointer 410 in the protocol pointer database 214, the UEFI engine 208 would determine that the protocol identifier 600 in the protocol identifier database 216 is associated with the protocol pointer 410, and the UEFI engine 208 would then utilize the function pointers 602a-602d in the protocol interface 602 provided with the protocol identifier 600 in the protocol identifier database 216 in order to execute the corresponding functions 412a-412d that are stored with the protocol producer driver 210c in the primary memory system 204 in order to perform the UEFI protocol provided by the protocol producer driver 210c.

However, as discussed above, conventional computing devices may allow malicious drivers provided on those conventional computing device to impersonate an authentic driver and provide a UEFI protocol that bypasses security checks in order to, for example, eavesdrop on credentials and/or other secure information, maliciously configure the computing device, etc. For example, malicious UEFI protocols providing malicious UEFI protocol services may be provided in a conventional computing device by a malicious driver via the replacement or modification of an authentic pointer with a malicious pointer that points to a malicious function that is stored with the malicious driver, and that performs the malicious UEFI protocol that provides the malicious UEFI protocol service. As discussed below, the protocol security system of the present disclosure prevents such malicious driver operations by tracking and verifying the trustworthiness of functions and/or the UEFI protocols they perform prior to performing those UEFI protocols.

The method 300 then proceeds to block 306 where the firmware interface engine identifies a protocol producer driver associated with the protocol pointer. In an embodiment, at block 306, the UEFI engine 208 may identify the protocol producer driver that is associated with the protocol pointer that was identified by the protocol consumer driver 212 at block 304. For example, at block 304 the protocol consumer driver 212 may identify to the UEFI engine 208 the protocol pointer 410 for the UEFI protocol that was provided by the protocol producer driver 210c and, at block 306, the UEFI engine 208 may receive that protocol pointer 410 and operate to identify that the protocol producer driver 210c provided that protocol pointer 410 in the protocol pointer database 214. In a specific example, the DXE core in the processing system that provides the UEFI engine 208 operates to load the protocol producer driver 210c into the memory range 404 in the primary memory system 204 (e.g., at 0x55000000–0x55010000 with image handle "A"), and may utilize a handle (e.g., an input handle "A" at 0x55000120, or the existing image handle "A") included in the protocol producer driver 210c to identify the UEFI protocol provided by that protocol producer driver 210c (i.e., because the input handle "A" at 0x55000120 is included in the memory range 0x55000000–0x55010000). As will be appreciated by one of skill in the art in possession of the present disclosure, the UEFI engine 208 may operate to identify any protocol producer driver that provided a protocol pointer in the protocol pointer database 214 in response to receiving that protocol pointer from a protocol consumer driver 212.

The method 300 then proceeds to decision block 308 where it is determined whether the protocol pointer is stored in the memory range with the protocol producer driver. In an embodiment, at decision block 306, the UEFI engine 208 may determine whether the protocol pointer identified in the protocol pointer database 214 by the protocol consumer driver 212 at block 304 is stored in the memory range on the primary memory system 204 that is associated with the protocol producer driver identified at block 306. Continuing with the example in which the protocol pointer 410 is identified by the protocol consumer driver 212 at block 304 and the protocol producer driver 210c is identified at block 306, at block 308 the UEFI engine 208 may determine whether the protocol pointer 410 is stored in the memory range 404 in which the protocol producer driver 210c is stored. For example, at block 308 the UEFI engine 208 may determine a protocol pointer address of the protocol pointer 410 identified by the protocol consumer driver 212 at block 304, and then determine whether that protocol pointer address is included in the memory range 404 on primary memory system 204 (e.g., as identified by the base address of the protocol producer driver 210c and the length of the protocol producer driver 210c, discussed above).

In an embodiment, the UEFI engine 208 may also determine whether functions pointers associated with an UEFI protocol point to functions that are stored in the memory range on the primary memory system 204 that is associated with the protocol producer driver identified at block 306. For example, the DXE core in the processing system that provides the UEFI engine 208 operates to load the protocol producer driver 210c into the memory range 404 in the primary memory system 204 (e.g., at 0x55000000–0x55010000 with image handle "A"), and the protocol producer driver 210c may produce the protocol interface 602 that includes the function pointer 602a that points to a memory address 0x55000360. As such, the trustworthiness of the function pointer 602a may be verified using the image handle "A" and the function pointer 602a, as the UEFI engine 208 knows that the image handle "A" was provided by the protocol producer driver 210c and can verify that the function pointer 602a points to a function included in the protocol producer driver 210c by verifying that the function pointer 602a points to the address 0x55000360 that is included in the memory range 0x55000000–0x55010000. As discussed below, protocol consumer drivers can request verification of function pointer trustworthiness by requesting that the UEFI engine 208 perform such operations for any function pointer in question.

If, at decision block 308, it is determined that the protocol pointer is not stored in the memory range with the protocol producer driver, the method 300 proceeds to block 310 where the firmware interface engine generates a protocol security violation. In an embodiment, at block 310, the UEFI engine 208 may determine that the protocol pointer identified in the protocol pointer database 214 by the protocol consumer driver 212 at block 304 is not stored in the memory range on the primary memory system 204 that is associated with the protocol producer driver identified at block 306. Continuing with the example in which the protocol pointer 410 is identified by the protocol consumer driver at block 304 and the protocol producer driver 210c is identified at block 306, at block 308 the UEFI engine 208 may determine that the protocol pointer 410 is not stored in the memory range 404 in which the protocol producer driver 210c is stored. For example, at block 308 the UEFI engine 208 may determine that the protocol pointer address of the protocol pointer 410 identified by the protocol consumer driver 212 at block 304 is not included in the memory range 404 on primary memory system 204 (e.g., as identified by the base address of the protocol producer driver 210c and the length of the protocol producer driver 210c, discussed above).

In a specific example, the protocol pointer address of the protocol pointer 410 may have been modified or replaced by a malicious driver that was provided on the primary memory system 204 such that the protocol pointer address of the protocol pointer 410 points to a memory range on the primary memory system 204 that includes the malicious driver and that stores function(s) that provide a malicious UEFI protocol (e.g., via a corresponding protocol identifier and protocol interface with function pointers in the protocol identifier database 216) and, as such, at decision block 308 the UEFI engine 208 may determine that protocol pointer address is not included in the memory range 404 of the protocol producer driver 210c that provided the protocol pointer 410. In response, at block 310, the UEFI engine 208 may generate a UEFI protocol security violation. In different embodiments, the UEFI protocol security violation generated at block 310 may include displaying a warning on a display of the computing device 200, preventing the performance of the UEFI protocol pointed to by the protocol pointer 410, disabling the UEFI protocol pointed to by the protocol pointer 410, deleting the UEFI protocol pointed to by the protocol pointer 410, and/or a variety of other UEFI Protocol security violation operations that would be apparent to one of skill in the art in possession of the present disclosure.

If at decision block 308, it is determined that the protocol pointer is stored in the memory range with the protocol producer driver, the method 300 proceeds to decision block 312 where it is determined whether the protocol pointer points to an architectural protocol. In an embodiment, at decision block 312, the UEFI engine 208 may determine that the protocol pointer identified in the protocol pointer database 214 by the protocol consumer driver 212 at block 304 is stored in the memory range on the primary memory system 204 that is associated with the protocol producer driver identified at block 306 and, in response, may determine whether the UEFI protocol pointed to by that protocol pointer is an architectural protocol. Continuing with the example in which the protocol pointer 410 is identified by the protocol consumer driver 212 at block 304 and the protocol producer driver 210c is identified at block 306, at block 308 the UEFI engine 208 may determine that the protocol pointer 410 is stored in the memory range 404 in which the protocol producer driver 210c is stored and, in response, may determine whether the UEFI protocol pointed to by the protocol pointer 410 is an architectural protocol at decision block 312. For example, at block 308 the UEFI engine 208 may determine that the protocol pointer address of the protocol pointer 410 identified by the protocol consumer driver 212 at block 304 is included in the memory range 404 on primary memory system 204 (e.g., as identified by the base address of the protocol producer driver 210c and the length of the protocol producer driver 210c, discussed above), and at decision block 312 will operate to determine whether the UEFI protocol provided by the protocol producer driver 210c is an architectural protocol.

As will be appreciated by one of skill in the art in possession of the present disclosure, architectural UEFI protocols may provide UEFI protocol services as file authentication services for UEFI secure boot, password services for user credentials, SetVariable services, SetAttribute services, and/or other services known in the art, and many of the UEFI protocol services provided by architectural UEFI protocols are essential to the operations of the computing device 200, with some being used to protect the UEFI firmware 206. For example, architectural UEFI protocols may include protocols defined by the UEFI Platform Initialization Specification as "The DXE Foundation is abstracted from the platform through the DXE Architectural Protocols. The DXE Architectural Protocols manifest the platform-specific components of the DXE Foundation. DXE drivers that are loaded and executed by the DXE Dispatcher component of the DXE Foundation must produce these protocols", and one of skill in the art in possession of the present disclosure will appreciate that UEFI architectural protocols are essential/ vital protocols/services in the UEFI firmware such that any absence or malicious tampering with architectural protocols will may render the UEFI firmware vulnerable. As such, one of skill in the art in possession of the present disclosure will recognize how the UEFI engine 208 may identify a type of the UEFI protocol that is pointed to by the protocol pointer 410 at decision block 312, and then determine whether that UEFI protocol is an architectural protocol.

If, at decision block 312, it is determined that the protocol pointer does not point to an architectural protocol, the method 300 proceeds to block 314 where the firmware interface engine allows execution of the protocol pointed to by the protocol pointer. In an embodiment, at block 314 and in response to determining that the UEFI protocol pointed to by the protocol pointer received at block 304 is not an architectural protocol, the UEFI engine 208 may operate to allow execution of the UEFI protocol pointed to by the protocol pointer received at block 304. Continuing with the example above where the protocol pointer 410 is received at block 304, at block 314 the UEFI engine 208 may operate to allow execution of the UEFI protocol pointed to by the protocol pointer 410 by identifying the protocol identifier 600 associated with that protocol pointer 410, and then utilizing the function pointers 602a-602d provided in the protocol interface 602 included with the protocol identifier 600 to execute the functions 412a-412d stored with the protocol producer driver 210c in the primary memory system 204 in order to perform the UEFI protocol provided by the protocol producer driver 210c.

If at decision block 312, it is determined that the protocol pointer points to an architectural protocol, the method 300 proceeds to decision block 316 where it is determined whether the protocol producer driver originated from a secondary memory system. In an embodiment, at decision block 316 and in response to determining that the UEFI protocol pointed to by the protocol pointer received at block 304 is an architectural protocol, the UEFI engine 208 may operate to determine whether the protocol producer driver that provided that protocol pointer originated from the serial peripheral interface memory system 218. Continuing with the example above where the protocol producer driver 210c was identified at block 306, at block 314 the UEFI engine 208 may operate to determine whether the protocol producer driver 210c originated from the serial peripheral interface memory system 218. As discussed above, the storage of the protocol producer drivers 210c on the primary memory system 204 operates to associate a "device path" with the protocol producer driver 210c that allows the origin of the protocol producer driver 210c (e.g., the secondary memory system 218/BIOS SPI ROM/flash memory, PCIe option ROM, external storage device, etc.) to be identified by the UEFI engine 208, and thus at decision block 316 the UEFI engine 208 may utilize the device path for the protocol producer driver 210c to determine if the protocol producer driver 210c originated from the serial peripheral interface memory system 218 (e.g., a BIOS SPI ROM/flash memory in the examples below).

If, at decision block 316, it is determined that the protocol producer driver originated from the secondary memory system, the method 300 proceeds to block 314 where the firmware interface engine allows execution of the protocol pointed to by the protocol pointer. In an embodiment, at block 314 the UEFI engine 208 may determine that the protocol producer driver that provided that protocol pointer originated from the serial peripheral interface memory system 218 and, in response, may allow execution of the UEFI protocol pointed to by that protocol pointer at block 314 in a manner that is similar to that described above. As will be appreciated by one of skill in the art in possession of the present disclosure, the protocol security system of the present disclosure may provide security for the performance of UEFI protocols by ensuring that any architectural UEFI protocols that are performed are provided by drivers that originated from the BIOS SPI ROM/flash memory, ensuring that third party (and possibly malicious) drivers originating from other storage locations cannot provide architectural UEFI protocols for performance on the computing device 200.

Continuing with the example above where the protocol producer driver 210c was identified at block 306, at decision block 316 the UEFI engine 208 may operate to determine that the protocol producer driver 210c originated from the serial peripheral interface memory system 218 and, in response, may allow execution of the UEFI protocol pointed to by the protocol pointer 410 at block 314 in a manner that is similar to that described above. In a specific example, at block 316 the UEFI engine 208 may utilize the device path for the protocol producer driver 210c to determine that the protocol producer driver 210c originated from the serial peripheral interface memory system 218 (e.g., a BIOS SPI ROM/flash memory) and, in response, may allow execution of the UEFI protocol pointed to by the protocol pointer 410 by identifying the protocol identifier 600 associated with that protocol pointer 410, and then utilizing the function pointers 602a-602d provided in the protocol interface 602 included with the protocol identifier 600 to execute the functions 412a-412d stored with the protocol producer driver 210c in the primary memory system 204 in order to perform the UEFI protocol provided by the protocol producer driver 210c.

If, at decision block 316, it is determined that the protocol producer driver did not originate from the secondary memory system, the method 300 proceeds to block 310 where the firmware interface engine generates a protocol security violation. In an embodiment, at block 316 the UEFI engine 208 may determine that the protocol producer driver that provided that protocol pointer did not originate from the serial peripheral interface memory system 218 and, in response, may generate a protocol security violation at block 310 in a manner that is similar to that described above. As will be appreciated by one of skill in the art in possession of the present disclosure, the protocol security system of the present disclosure may provide security for the performance of UEFI protocols by preventing the performance of any architectural UEFI protocols provided by drivers that did not originate from the BIOS SPI ROM/flash memory, ensuring that architectural UEFI protocols provided by third party (and possibly malicious) drivers originating from other storage locations will not be performed on the computing device 200.

Continuing with the example above where the protocol producer driver 210c was identified at block 306, at decision block 316 the UEFI engine 208 may operate to determine that the protocol producer driver 210c did not originate from the serial peripheral interface memory system 218 and, in response, may generate a protocol security violation at block 310 in a manner that is similar to that described above. In a specific example, at block 316 the UEFI engine 208 may utilize the device path for the protocol producer driver 210c to determine that the protocol producer driver 210c did not originate from the serial peripheral interface memory system 218 (e.g., a BIOS SPI ROM/flash memory) and, in response, may generate a UEFI protocol security violation. In different embodiments, the UEFI protocol security violation generated at block 310 may include displaying a warning on a display of the computing device 200, preventing the performance of the UEFI protocol pointed to by the protocol pointer 410, disabling the UEFI protocol pointed to by the protocol pointer 410, deleting the UEFI protocol pointed to by the protocol pointer 410, and/or a variety of other UEFI Protocol security violation operations that would be apparent to one of skill in the art in possession of the present disclosure.

In some embodiments, the UEFI engine 208 may allow the protocol consumer drivers 212 to request checks on protocol pointers and their associated UEFI protocols to ensure the trustworthiness of those protocol pointers/UEFI protocols. For example, the DXE core in the processing system that provides the UEFI engine 208 may provide an "IsProtocolTrusted(protocol pointer, protocol identifier)" API to the protocol consumer driver 212 that may be utilized to confirm that protocol pointers and/or the function pointers associated with those protocol pointers, are still located within the protocol producer driver that provided them. As will be appreciated by one of skill in the art in possession of the present disclosure, such confirmations may be particularly useful for protocol consumer drivers that locate UEFI protocols once, and then reuse the pointers for those UEFI protocols to have those UEFI protocols performed as subsequent time(s). As such, a protocol consumer driver 212 may check whether a stored pointer for a UEFI protocol is still trustworthy via utilization of the "IsProtocolTrusted (protocol pointer, protocol identifier)" API, which causes the UEFI engine 208 to determine whether a protocol pointer is still stored in the memory range on the primary storage system 204 that is associated with the protocol producer driver that provided it, as discussed above with reference to decision block 308, and/or determine whether function pointers associated with a UEFI protocol provided by a protocol producer driver still point to functions that are stored in the memory range on the primary storage system 204 that is associated with that protocol producer driver.

Thus, systems and methods have been described that provide for the tracking of UEFI protocols provided for use in a computing device in order to allow the verification of the UEFI protocol producer driver that provided a UEFI protocol that is to-be performed, ensure that UEFI protocol is located with that UEFI protocol producer driver and, if that UEFI protocol is an architectural protocol, verify that UEFI protocol producer driver originated from a BIOS SPI ROM/flash memory that is authorized to provide architectural UEFI protocols. For example, a UEFI protocol security system includes a UEFI protocol producer driver that is stored in a first memory range on a primary memory system, a UEFI protocol consumer driver that is stored on the primary memory system, and a UEFI engine that is provided via the primary memory system. The UEFI engine receives a UEFI protocol pointer from the UEFI protocol consumer driver, and identifies that the UEFI protocol pointer was provided by the UEFI protocol producer driver. In response to determining that the UEFI protocol pointer is not stored in the first memory range on the primary memory system, the UEFI engine will generate a UEFI protocol security violation. If the UEFI protocol pointer is stored in the first memory range on the primary memory system and the UEFI engine determines that the UEFI protocol pointer points to an architectural UEFI protocol, the UEFI engine determines whether the UEFI protocol producer driver originated from a BIOS SPI ROM/flash memory and, if not, the UEFI engine generates a UEFI protocol security violation. As such, the performance of UEFI protocols in a computing device may be secured to ensure that any UEFI protocols that are performed are stored with the UEFI protocol producer driver that provided them, and that any architectural UEFI protocols that are performed come from UEFI protocol producer drivers that originated from an authorized BIOS SPI ROM/ flash memory.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A protocol security system, comprising:
   a first protocol producer driver that is stored in a first memory range on a primary memory system;
   at least one protocol consumer driver that is stored on the primary memory system; and
   a firmware interface engine that is provided via the primary memory system and that is configured to:
   receive, from the at least one protocol consumer driver, a first protocol pointer;
   identify that the first protocol pointer was provided by the first protocol producer driver;

determine, in response to identifying that the first protocol pointer was provided by the first protocol producer driver, that the first protocol pointer is not stored in the first memory range on the primary memory system; and generate, in response to determining that the first protocol pointer is not stored in the first memory range on the primary memory system, a protocol security violation.

2. The system of claim 1, further comprising:

a second protocol producer driver that is stored in a second memory range on the primary memory system, wherein the firmware interface engine is configured to:

receive, from the at least one protocol consumer driver, a second protocol pointer;

identify that the second protocol pointer was provided by the second protocol producer driver;

determine, in response to identifying that the second protocol pointer was provided by the second protocol producer driver, that the second protocol pointer is stored in the second memory range on the primary memory system; and determine, in response to determining that the second protocol pointer is stored in the second memory range on the primary memory system, whether the second protocol pointer points to an architectural protocol.

3. The system of claim 2, wherein the firmware interface engine is configured to:

allow, in response to determining that the second protocol pointer does not point to an architectural protocol, execution of a second protocol pointed to by the second protocol pointer.

4. The system of claim 2, wherein the firmware interface engine is configured to:

determine, in response to determining that the second protocol pointer points to an architectural protocol, whether the second protocol producer driver originated from a secondary memory system.

5. The system of claim 4, wherein the firmware interface engine is configured to:

allow, in response to determining that the second protocol producer driver originated from a secondary memory system, execution of a second protocol pointed to by the second protocol pointer.

6. The system of claim 4, wherein the firmware interface engine is configured to:

generate, in response to determining that the second protocol producer driver did not originate from a secondary memory system, the protocol security violation.

7. An Information Handling System (IHS), comprising:

a processing system; and a primary memory system that is coupled to the processing system and that includes instructions that, when executed by the processing system, cause the processing system to provide a firmware interface engine that is configured to:

receive, from at least one protocol consumer driver that is stored on the primary memory system, a first protocol pointer;

identify that the first protocol pointer was provided by the first protocol producer driver;

determine, in response to identifying that the first protocol pointer was provided by the first protocol producer driver, that the first protocol pointer is not stored in a first memory range on the primary memory system that is associated with the first protocol producer driver; and generate, in response to determining that the first protocol pointer is not stored in the first memory range on the primary memory system that is associated with the first protocol producer driver, a protocol security violation.

8. The IHS of claim 7, wherein the firmware interface engine is configured to:

receive, from the at least one protocol consumer driver, a second protocol pointer;

identify that the second protocol pointer was provided by a second protocol producer driver;

determine, in response to identifying that the second protocol pointer was provided by the second protocol producer driver, that the second protocol pointer is stored in a second memory range on the primary memory system that is associated with the second protocol producer driver; and determine, in response to determining that the second protocol pointer is stored in the second memory range on the primary memory system that is associated with the second protocol producer driver, whether the second protocol pointer points to an architectural protocol.

9. The IHS of claim 8, wherein the firmware interface engine is configured to:

allow, in response to determining that the second protocol pointer does not point to an architectural protocol, execution of a second protocol pointed to by the second protocol pointer.

10. The IHS of claim 8, wherein the firmware interface engine is configured to:

determine, in response to determining that the second protocol pointer points to an architectural protocol, whether the second protocol producer driver originated from a secondary memory system.

11. The IHS of claim 10, wherein the firmware interface engine is configured to:

allow, in response to determining that the second protocol producer driver originated from a secondary memory system, execution of a second protocol pointed to by the second protocol pointer.

12. The IHS of claim 10, wherein the firmware interface engine is configured to:

generate, in response to determining that the second protocol producer driver did not originate from a secondary memory system, the protocol security violation.

13. The IHS of claim 7, wherein the firmware interface engine is configured to:

store the first protocol driver in the primary memory system; and associate the first memory range on the primary memory system with the first protocol pointer.

14. A method for securely performing protocols, comprising:

receiving, by a firmware interface engine from at least one protocol consumer driver that is stored on a primary memory system, a first protocol pointer;

identifying, by the firmware interface engine, that the first protocol pointer was provided by the first protocol producer driver;

determining, by the firmware interface engine in response to identifying that the first protocol pointer was provided by the first protocol producer driver, that the first protocol pointer is not stored in a first memory range on the primary memory system that is associated with the first protocol producer driver; and generating, by the firmware interface engine in response to determining that the first protocol pointer is not stored in the first memory range on the primary memory system that is associated with the first protocol producer driver, a protocol security violation.

15. The method of claim 14, further comprising:
receiving, by the firmware interface engine from the at least one protocol consumer driver, a second protocol pointer;
identifying, by the firmware interface engine, that the second protocol pointer was provided by a second protocol producer driver;
determining, by the firmware interface engine in response to identifying that the second protocol pointer was provided by the second protocol producer driver, that the second protocol pointer is stored in a second memory range on the primary memory system that is associated with the second protocol producer driver; and
determining, by the firmware interface engine in response to determining that the second protocol pointer is stored in the second memory range on the primary memory system that is associated with the second protocol producer driver, whether the second protocol pointer points to an architectural protocol.

16. The method of claim 15, further comprising:
allowing, by the firmware interface engine in response to determining that the second protocol pointer does not point to an architectural protocol, execution of a second protocol pointed to by the second protocol pointer.

17. The method of claim 15, further comprising:
determining, by the firmware interface engine in response to determining that the second protocol pointer points to an architectural protocol, whether the second protocol producer driver originated from a secondary memory system.

18. The method of claim 17, further comprising:
allowing, by the firmware interface engine in response to determining that the second protocol producer driver originated from a secondary memory system, execution of a second protocol pointed to by the second protocol pointer.

19. The method of claim 17, further comprising:
generating, by the firmware interface engine in response to determining that the second protocol producer driver did not originate from a secondary memory system, the protocol security violation.

20. The method of claim 14, further comprising:
storing, by the firmware interface engine, the first protocol driver in the primary memory system; and
associating, by the firmware interface engine, the first memory range on the primary memory system with the first protocol pointer.

\* \* \* \* \*